United States Patent [19]

Inariba

[11] 4,052,630
[45] Oct. 4, 1977

[54] SYNCHRONOUS MICROMOTOR

[76] Inventor: Tokuzo Inariba, c/o Room No. 906, Kamiuma Mansion, No. 2-9, Kamiuma 4-chome, Setagaya, Tokyo, Japan

[21] Appl. No.: 635,094

[22] Filed: Nov. 25, 1975

[30] Foreign Application Priority Data

Nov. 25, 1974   Japan ................................. 49-135758

[51] Int. Cl.² .......................................... H02K 21/14
[52] U.S. Cl. ..................................... 310/162; 310/154
[58] Field of Search ................. 310/40 MM, 162–165, 310/112, 114, 168, 263, 266, 154, 155, 181

[56]         References Cited
         U.S. PATENT DOCUMENTS

| | | | |
|---|---|---|---|
| 2,756,357 | 7/1956 | Schaberg | 310/168 |
| 3,004,181 | 10/1961 | Noddin | 310/263 |
| 3,319,100 | 5/1967 | Erickson | 310/263 X |
| 3,479,539 | 11/1969 | Brion | 310/162 X |
| 3,541,410 | 11/1970 | Rothert | 310/263 X |
| 3,904,902 | 9/1975 | Inariba | 310/162 |
| 3,984,709 | 10/1976 | Kuwako et al. | 310/40 MM |

Primary Examiner—Donovan F. Duggan
Attorney, Agent, or Firm—Steinberg & Blake

[57] ABSTRACT

A synchronous micromotor having a central rotor shaft coaxially surrounded by a permanent magnet structure including a plurality of north poles and a plurality of south poles which circumferentially alternate with the north poles, all of these poles being circumferentially distributed about the rotor shaft and directed outwardly away from the latter. The permanent magnet structure is in turn coaxially surrounded by a cylindrical wall structure which is in turn coaxially surrounded by an annular outer coil structure. The cylindrical wall structure is made of a soft magnetic material and has a pair of annular yoke portions surrounding the rotor shaft and spaced axially one from the other, the cylindrical wall structure having between the annular yoke portions thereof a plurality of elongated apertures each extending from one to the other of the yoke portions helically with respect to the axis of the rotor shaft.

19 Claims, 24 Drawing Figures

SYNCHRONOUS MICROMOTOR

BACKGROUND OF THE INVENTION

The present invention relates to synchronous micrometers.

In certain known synchronous electric motors which utilize a magnet, a mechanical structure is provided to determine the direction of rotation of the motor so as to achieve a single direction of rotation instead of a two-directional rotation which otherwise would occur. However, such mechanisms have serious drawbacks and cause various difficulties. For example, it is known to use a shading coil in order to achieve a desired direction of rotation, but such structures are disadvantages in that they require an excessive consumption of power and as a result have an extremely low power efficiency. A two-phase electromotor utilizing a pair of electromotors of the two-directional type axially connected to each other has also the disadvantage of being very costly while occupying an undesirably large amount of space and having a low power efficiency.

SUMMARY OF THE INVENTION

It is accordingly a primary object of the present invention to provide a synchronous micromotor which will avoid the above drawbacks.

In particular, it is an object of the present invention to provide a motor of this type which does not require a substantial weight for inertia purposes and which at the same time has a high efficiency while avoiding the use of mechanisms, shading coils, or the like to achieve a given direction of rotation.

Thus, according to the invention the synchronous motor will have a highly reliable direction of rotation as well as a high starting characteristic, these advantages being achieved by cooperation of a permanent magnet and a cylindrical body of soft magnetic material formed with elongated helical apertures which are oppositely inclined one with respect to the next to provide between the apertures elongated tapered wall portions which taper from one to the next in opposed axial directions. This construction achieves a high operating efficiency without requiring either the use of a mechanical means to determine directivity or the use of electrical components such as a shading coil or a tow-coil phase advancing system.

Specifically, according to the present invention there is provided a synchronous electrical motor of high power efficiency and negligible rise in temperature, wherein a reliable directivity of rotation is achieved by the cooperation of the static and dynamic positions with respect to the tapered oppositely extending axial wall portions of the cylindrical body of soft magnetic material.

Thus, the present invention relates to a synchronous micromotor of the self-starting type and, more particularly, to a synchronous micromotor of this type which includes a coil, a permanent magnet which may serve as a stator, and a cylindrical wall means forming part of a rotor and having the tapered axially extending wall portions which taper from one to the next in opposed axial directions so that according to this geometric arrangement the magnetic flux of an AC magnetic field which develops as a result of excitation of the coil may be effectively intersected by the magnetic flux which is present over a cylindrical surface of the permanent magnet and annular magnetic yoke portions of the rotor which are adapted to minimize the magnetic loss in a gap wherein the AC magnetic circuit is established.

Of course, various types of synchronous electric motors have already been proposed and are well known. In the known electromotors of this type, however, all of the salient-poles are simultaneously magnetized either as south or north poles synchronously with a frequency according to the AC excitation of the movable iron core rotor, and the south or north polarities develop in the stator in accordance with poles which are opposed to the salient-poles with the interposition of a gap. In this case the number of salient-poles corresponds to one-half the number of magnetic poles included in the magnet. With this relationship between the number of salient-poles and the number of magnet poles, there will be with the known electromotors only one-half of the magnetic poles which can be effectively utilized and the polarities of the stator also cannot be effectively utilized with respect to timing.

On the other hand, according to the present invention the number of oppositely tapering elongated wall portions of the cylindrical wall means of soft magnetic material equals the number of magnetic poles on the rotor so that the AC excitation causes these tapered wall portions of the rotor to develop north and south poles alternately and simultaneously at the rotor in accordance with the number of magnet poles. It is thus apparent that an efficiency which is twice as high as that which can be obtained with the known motors is achieved by way of the present invention.

Furthermore, with the known motors, the moment of inertia and the weight of the rotor must be relatively great since a heavy rotor is required to obtain a smooth rotary movement. These requirements, in turn, have greatly reduced the self-starting capability of the known electromotors. It is well known that where an electromicromotor has a rotor which is relatively heavy and of a relatively high moment of inertia, the power required for starting an operation is adversely affected, and as a result the operating efficiency is undesirably reduced while in addition there is an undesirable generation of heat.

Furthermore, with previously known electromotors the north and south poles develop between the stator and the rotor so that the permanent magnet cannot be effectively utilized.

With the present invention, however, all of these drawbacks are avoided and instead an electromicromotor of lightweight is provided with this motor of the invention being of the self-starting type and rotating reliably when energized. With the synchronous electromotor of the present invention it is possible to utilize a rotor which has a low moment of inertia and a lightweight while achieving a smooth rotary movement, with the desired rotary movement being achieved while utilizing a relatively small magnetic force.

Thus, in this way it is possible to achieve the objects of the present invention which include the provision of the synchronous electromicromotor having a relatively high efficiency while avoiding generation of undesirable heat and at the same time utilizing a permanent magnet in a highly effective manner.

Thus, according to the present invention there is provided a synchronous electromotor of the self-starting type which includes a stator having an annular permanent magnet means made up of a series of north and south poles alternately distributed circumferentially along the periphery of the permanent magnet means while surrounding a predetermined axis with the poles being directed outwardly away from this axis while extending parallel thereto. A coil surrounds the permanent magnet means and also extends circumferentially around the same axis coaxially with the permanent magnet means. Thus the coil and permanent magnet means both have a common axis.

According to one embodiment of the invention, a rotor which rotates about the latter common axis includes an elongated cylindrical wall means which is coaxial with the permanent magnet means and coil surrounding the permanent magnet means and being surrounded by the coil so as to be situated between the permanent magnet means and the coil. This cylindrical wall of the rotor is made of a soft magnetic material and is formed with a plurality of apertures which extend helically with respect to the above axis with one group of these apertures alternating with another group and being helically inclined oppositely to the other group so that in this way the apertures define between themselves elongated tapered wall portions where each tapered wall portion tapers axially in a direction opposite to the direction of taper of the adjoining tapered wall portions. These tapered wall portions are situated between and bridge a pair of annular magnetic yoke portions of the cylindrical wall, these yoke portions surrounding the above common axis and being axially spaced therealong. Preferably, the permanent magnet has a number of poles equal to the number of elongated tapered wall portions of the rotor. The cylindrical rotor and the stationary magnet are positioned with respect to each other when the coil provided for excitation is not energized in such a wauy that each tapered wall portion positively takes a position situated along a boundary line between the center line of a given pole and a center line of an adjacent pole of opposite polarity. The rotor includes at one end of the cylindrical wall one of the above annular magnetic yoke portions while the stator includes a casing which has an inner cylindrical surface coaxially surrounding the annular magnetic yoke portion and defining therewith a narrow gap of relatively small radial width. In fact both of the annular magnetic yoke portions of the cylindrical wall means define such a narrow gap with the inner cylindrical surface of the casing. Therefore, the axially opposed ends of the cylindrical rotor where the annular yoke portions thereof are situated define together with the adjacent inner surface of the casing an AC magnetic circuit over an adequate area with a relatively slight gap or spacing. At one of the above annular magnetic yoke portions of the cylindrical wall means, in particular, that one thereof which is distant from a transverse wall of the casing, the rotor may have an outwardly extending flange which is slightly spaced from while being parallel to an end wall of the casing so as to define a narrow gap therewith.

Thus, the electromotor according to the present invention includes the above coil, the permanent magnet which may serve as the stator and the cylindrical rotor of circular cross section, wherein the cylindrical wall means of this rotor has the above axially extending tapered wall portions each of which tapers oppositely with respect to the immediately preceding and immediately following tapered wall portions while these tapered wall portions bridge between the opposed annular yoke portions situated at the axially opposed ends of the rotor. These yoke portions are arranged so as to reduce the magnetic resistance with respect to stationary magnetic yoke portions. The geometry of the tapered wall portions of the rotor is selected in such a way that the magnetic flux of the AC magnetic field produced by the coil is effectively intersected by the magnetic flux of the DC magnetic field present at the cylindrical surface of the permanent magnet. The opposed ends of the rotor are situated within the narror gap defined between the AC magnetic field and in this way a possible loss of AC magnetic flux is minimized.

BRIEF DESCRIPTION OF DRAWINGS

The invention is illustrated by way of example in the accompanying drawings which form part of this application and in which:

FIG. 10 is a further illustration of the manner in which the embodiment of FIG. 8 operates;

DESCRIPTION OF PREFERRED EMBODIMENTS

Figure 1:
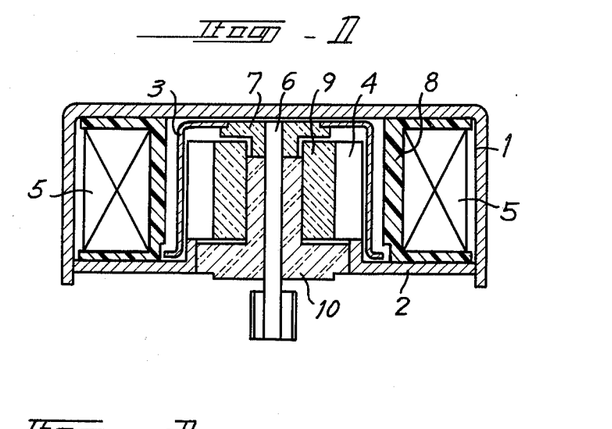
FIG. 1 is a sectional elevation of one embodiment of a motor according to the invention, the section of FIG. 1 being taken in a plane which contains the axis of the motor.
Figure 2:
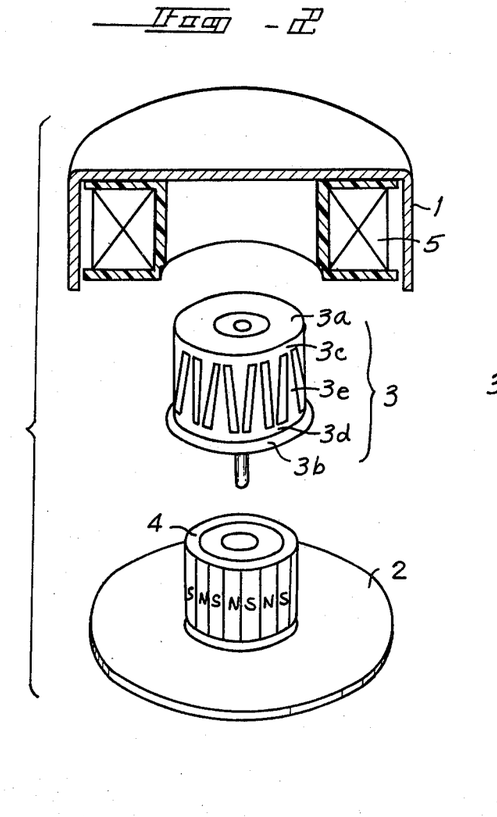
FIG. 2 is a partly sectional schematic exploded elevation of the structure of FIG. 1 illustrating additional details thereof.

Referring now to FIGS. 1 and 2, the synchronous micromotor of the invention illustrated therein includes an outer casing 1 to which a base plate 2 is fixed. Thus, the casing 1 has a transverse wall and at the periphery of the latter a cylindrical wall, and the base plate 2 is fixed at its outer periphery to the inner surface of the cylindrical wall of the casing 1. The casing 1and the base plate 2 are made of a soft magnetic material and serve not only as a casing or housing structure but also as a yoke.

The illustrated motor includes a rotary rotor shaft 6 which is operatively connected with a cylindrical wall means 3, described in greater detail below, to form therewith part of the rotor assembly of the motor of FIG. 1. The shaft 6 is supported for rotary movement by a bearing 10 made of a non-magnetic material and centrally fixed to the circular base plate 2.

This bearing 10 serves not only to support the rotor shaft 6 for rotation but also to support a circular or annular permanent magnet means 4 which may be of the barium or ferrite type, the bearing 10 directly being connected with a non-magnetic ring 9 on which the annular permanent magnet means 4 is mounted. This permanent magnet means 4 is provided with a series of north and south poles circumferentially distributed about the axis of the shaft 6 with the north poles respectively alternating with the south poles. In the illustrated example the permanent magnet means 4 has eight south poles and eight north poles alternating therewith, and these poles are of equal circumferential width and are uniformly distributed about the central motor axis which coincides with the axis of the shaft 6.

Between the base plate 2 and the transverse flat wall of the casing 1 is a supporting structure 8 which surrounds the permanent magnet means 4 and on which a coil means 5 is wound so that the outer coil means 5 is coaxial with but is spaced from and circumferentially surrounds the permanent magnet means 4 with the supporting structure 8 having an inner surface which defines with the exterior surface of the permanent magnet means 4 an axial annular gap of uniform radial width. Thus, the several poles of the permanent magnet means 4 are directed outwardly toward the supporting structure 8 for the coil 5.

As is apparent from FIG. 2, the cylindrical wall means 3 of the rotor assembly, which is made of a soft magnetic material, has an elongated cylindrical wall of circular cross section which surrounds the shaft 6 coaxially and which is situated in the above gap between the permanent magnet means 4 and the inner surface of the supporting structure 8 of the coil means 5. It is to be noted that all of the structure is stationary except the rotor assembly which includes the shaft 6 and the cylindrical wall means 3 as well as the non-magnetic element 7 which is situated between and interconnects the cylindrical wall means 3 with the rotor shaft 6.

According to a particular feature of the present invention the cylindrical wall means 3 has a pair of annular yoke portions 3c and 3d which are axially spaced from each other and which coaxially surround the shaft 6. As is illustrated in FIG. 2, a plurality of elongated apertures are formed in the cylindrical wall means 3 between the annular yoke portions 3c and 3d thereof with each of these apertures having opposed ends situated at the yoke portions 3c and 3d. These elongated apertures are helically inclined with respect to the axis of the shaft 6, and, as is apparent from FIG. 2, the series of apertures form two groups which alternate with each other with the apertures of one group being helically inclined oppositely to the apertures of the other group. In this way there is defined between these elongated apertures, elongated tapered wall portions 3e which taper axially with each tapered wall portion 3e being axially tapered in a direction opposite to the immediately preceding and immediately following tapered wall portion. All of the elongated helical apertures are of equal uniform circumferential widths in the illustrated example and the opposed ends of each aperture are situated equidistantly from the adjoining ends of the next apertures so that in this way the tapered wall portions 3e are uniformly distributed about the rotor axis with all of the wall portions 3e being identical except for their opposite axial orientation as described above and shown in FIG. 2. Thus, the annular yoke portions 3c and 3d are bridged by the oppositely extending tapered wall portions 3e. Thus each of these tapered wall portions will have next to one of the yoke portions a relatively wide end and next to the other of the yoke portions a relatively narrow end, these opposed ends of the tapered wall portions merging into the yoke portions.

As was pointed out above, and as is shown particularly in FIG. 1, the free end of the shaft 6, the upper end thereof as viewed in FIG. 1, is fixed with a circular non-magnetic element 7 which made be made of a light alloy or synthetic resin, this component being fixed in a central opening which is formed in the annular magnetic yoke portion 3a which forms an end wall of the cylindrical wall means 3. Opposite to this end wall 3a, the cylindrical wall means 3 has an outwardly directed flange 3b which projects from an edge of the annular yoke portion 3d. These portions 3a and 3b are situated at a small distance from the transverse wall of the casing 1 and the base 2, respectively, so as to define narrow gaps therewith, these extremely narrow gaps being distributed over an area sufficient to establish an AC magnetic circuit of extremely high efficiency between the structure 1,2 and the cylindrical wall means 3 at these narrow gaps. Thus, as a result of this constructions the desired AC magnetic circuit is assured.

Figure 3:
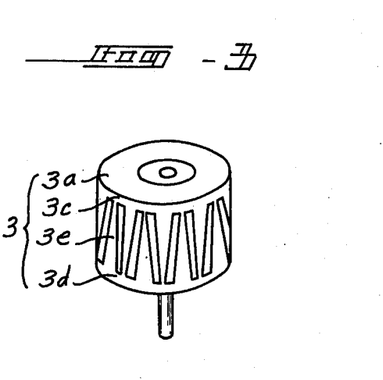
FIG. 3 illustrates in a perspective view another embodiment of a rotor which may be used with the remaining structure of FIGS. 1 and 2.

However, the flange 3b is not essential, and FIG. 3 shows an embodiment where the cylindrical wall means 3 is identical with that of FIG. 2 except that the annular flange 3b is not included in the embodiment of FIG. 3.

Figure 7:
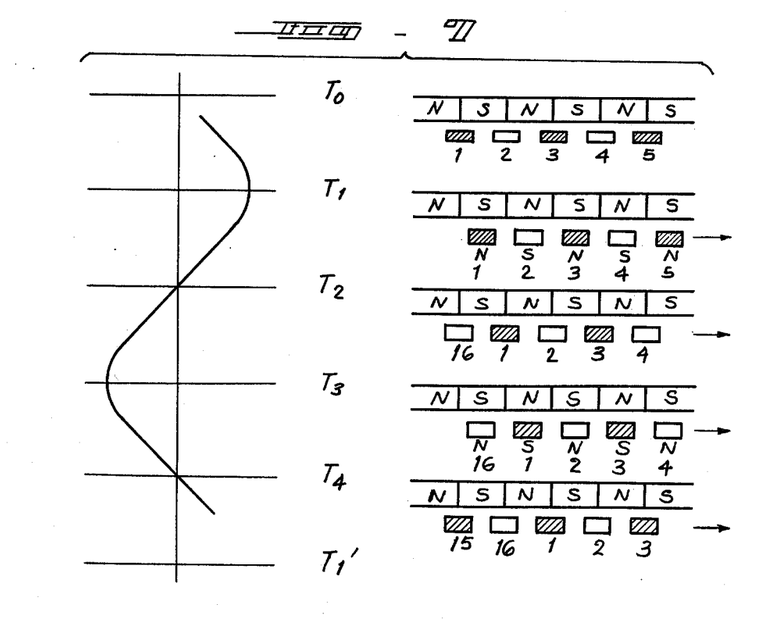
FIG. 7 is a schematic representation illustrating further how the embodiment of FIGS. 1-3 operates.

The manner in which this embodiment of the invention operates to generate a desired torque is schematically illustrated in FIG. 7. In the illustrated example the annular permanent magnet means 4 has sixteen poles made up of eight north poles and eight south poles alternating with the north poles, and in the illustrated example the cylindrical wall means 3 has sixteen tapered wall portions 3e eight of which are tapered in one axial direction while the remaining eight are tapered in the opposite axial direction and alternate with the first eight. Thus, the total number of tapered wall portions 3e equals the total number of magnetic poles.

Figure 4:
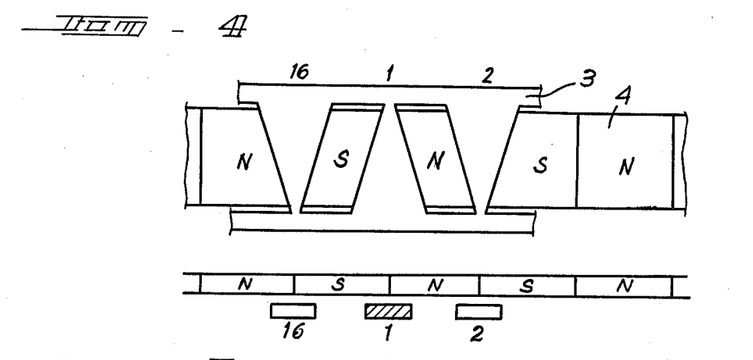
FIG. 4 is a schematic illustration of the manner in which the structure of FIGS. 1-3 operates.
Figure 5:
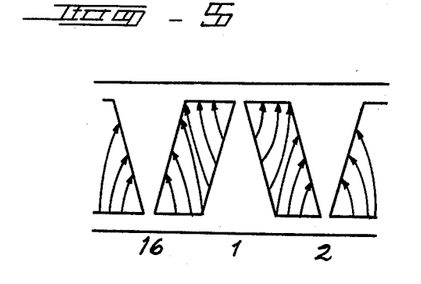
FIG. 5 illustrates flux distribution in the non-energized or static state.

Referring to FIGS. 4 and 7, some of the tapered wall portions are schematically indicated with odd-numbered tapered wall portions being shaded and all being tapered in the same axial direction while the unshaded even-numbered tapered wall portions are tapered in the opposite axial direction. These odd-numbered tapered wall portions may be considered as those which have the narrow upper ends in FIG. 2 merging into the yoke portion 3c while the unshaded even-numbered tapered wall portions may be considered as those which have the lower narrow ends in FIG. 2 merging into the yoke portion 3d. When the motor is not energized, at the time T0 at the upper part of FIG. 7, the tapered wall portions 3e take a position where they are equally spaced from the center of one given pole and the center of the next adjacent pole. This is a position corresponding to that shown in FIG. 5 where the flux distribution from the permanent magnet means is schematically indicated.

Thus, when the motor is not energized each tapered wall portion 3e positively takes position where its central axial line is circumferential aligned with a boundary line between a given south pole and the adjacent north pole of the permanent magnet means 4, inasmuch as in this position the magnetic resistance which is encountered is at a minimum. Thus, this forms the so-called static position of the motor.

Figure 6:
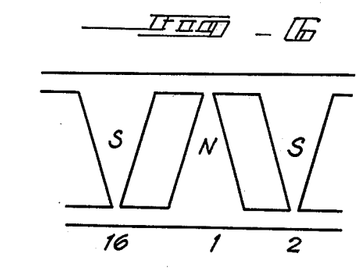
FIG. 6 illustrates the manner in which parts of the rotor assume polarity in an energized or dynamic state.

Assuming now that the motor is energized by way of a suitable AC source connected to the coil 5, then at the time point T1 shown in FIG. 7 the motor will assume the position indicated. This time point T1 occurs at an interval after the instant of energizing on the order of 0-½ c/s, corresponding to the duration required until the rotor reaches, while swinging to and fro, the optimal position in terms of the electromagnetic requirements. At this time point T1, the odd-numbered tapered wall portions may be considered as being magnetized so as to have north polarities, while the oppositely tapered even-numbered wall portions have south polarities, and this polarity is also indicated in FIG. 6. The electrical current assumes a maximum value at the time point T1. The polarities which are thus generated in the individual tapered wall portions 3e cause the rotor to move to a position where the several tapered wall portions are aligned with the several poles of the permanent magnet means in the manner indicated at the time T1 in FIG. 7. This position may be considered as a dynamic position of the rotor in that the motor is operating at this time and the rotor is turning. At the subsequent time point T2, there is no current flowing through the energizing coil so that the tapered wall portions again are not excited and thus again move, to the right as shown by the arrows in FIG. 7, to the zones which are situated between the associated pairs of adjacent north and south poles of the permanent magnet means. The rotor, however, will rotate further as a result of the effect of inertia, so that the tapered wall portions 3e move beyond the intermedite zones between the adjacent pairs of north and south poles of the permanent magnet means 4.

At the next time point T3, the odd-numbered tapered wall portions 3e will be excited so as to have south polarities while the even-numbered oppositely tapered wall portions will now be magnetized with north polarities, and thus the rotor will turn further to a position at which the tapered wall portions are respectively aligned with the next poles of the permanent magnet means 4, as illustrated at the time point T3 in FIG. 7.

Then, at the time point T4, there is again no electrical current flowing in the exciting coil, so that the several tapered wall portions 3e of the cylindrical wall means 3 are not excited and the rotor now continues to rotate under the effect of inertia in the same direction. Thus the individual tapered wall portions 3e of the rotor will travel past the respective zones intermediate the respective pairs of adjacent north and south poles of the permanent magnet means 4.

The time point T4 of course corresponds to the time point T0 and the subsequent time point T1' corresponds to the time point T1 with the operations then being cyclically repeated. Thus the motor will operate continuously in this manner while the coil 5 is connected to the AC source. Thus FIG. 7 indicates how with the motor according to the invention the north and south polarities are simultaneously developed in the tapered wall portions of the rotor as a result of the excitation as set forth above.

As will be understood from the above, in accordance with the present invention a torque is produced in the rotor as a result of the magnetization as set forth in connection with FIG. 7. The prior art motors of the same general type have required a rotor where the moment of inertia and the weight are considerably greater than that of the motor of the invention in order to achieve a smooth rotation. With the motor of the invention, on the contrary, a self-starting rotation of high efficiency is achieved as a result of the timely cooperation of the static position of the rotor in the non-excited state and the dynamic position thereof at the excited state even though the moment of inertia and the weight of the rotor of the invention are extremely small. With the previously known motors of this general type it has been impossible to reduce the weight of the rotor as desired inasmuch as the rotor required a predetermined moment of inertia and particularly when concerned with an electromicromotor, the moment of inertia as well as the weight of the rotor have always tended to reduce to an exceedingly large extent the efficiency with which self-starting takes place. These known electromicromotors thus have required relatively large weight and moment of inertia at the rotor, and these requirements have adversely influenced the power for starting and operating the motors with the result that a low operating efficiency and an undesirable temperature rise are encountered.

According to the invention, on the other hand, the cylindrical wall means of circular cross section of the rotor has the annular magnetic yoke portions which define together with the transverse walls of the casing which serves as the stator the narrow gaps to achieve the desired AC magnetic circuit, thus assuring maximum efficiency. Furthermore, the magnetic loss of the cylindrical rotor and the stator yoke is limited so as to be at a minimum according to the invention, so that it is possible to produce in this way an intense magnetic flux between the permanent magnet of the stator and the tapered wall portions of the rotor so as to generate simultaneously the same number of north and south poles in the rotor as in the permanent magnet means of the stator. As a result it is possible to generate a torque of high efficiency.

With prior art electric motors of this general type it has been impossible to achieve an effective utilization of the permanent magnet inasmuch as there is usually a generation of north and south poles between the stator and the rotor. According to the present invention, in contrast, the rotor has at its peripheral surface the same number of tapered wall portions as the number of poles of the permanent magnet, so that the desired north and south polarities are easily and simultaneously generated at the tapered wall portions with the result that the AC magnetic flux thus formed at the rotor can be effectively intersected by the magnetic flux of the DC magnetic field generated by the permanent magnet which forms part of the stator. In this manner a magnetic effect is achieved by the synchronous micromotor according to the invention with this magnetic effect being extremely great, in a manner which is impossible to achieve with previously known electric motors of this type.

Furthermore, with the electric motor of the invention it is possible to generate twice the torque which can be generated with previously known electric motors of this type. Specifically, in the previously known electric motors of this type of the number of salient-poles included in the rotor of the movable iron core type is one-half) of poles included in the permanent magnet, and to any given instant only north polarities or south polarities are generated. In contrast, with the rotor of the invention the number of tapered wall portions at the rotor equals the number of magnetic poles of the permanent magnet means and at these tapered wall portions north and south polarities are simultaneously generated so that a torque of high efficiency is produced. The coil means 5 is stationary, together with the coil-supporting structure of bobbin element 8. The cylindrical rotor of circular cross section is arranged inside the coils so that the outer peripheral surface of the rotor is spaced slightly from and opposite to the inner surface of the coil to define a slight gap therewith. The opposed ends of the rotor define together with the associated adjacent portions of the casing the respective narrow gaps which will establish the required AC magnetic circuit.

Although the number of individual poles of the permanent magnet corresponds to the number of tapered wall portions on the rotor in the embodiment described above, various modifications are possible insofar as the number of individual poles of the permanent magnet may be increased an even-number of times along with the number of tapered wall portions of the rotor. As pointed out above, each of the tapered wall portions of the cylindrical wall means assumes its position just between a pair of successive poles of the permanent magnet means which have opposite polarity. Furthermore, the gaps defined between the permanent magnet means, the cylindrical wall means, and the coil may be reduced to the required extent as a result of the particular arrangement of the annular magnetic yoke portions of the rotor, and the AC magnetic field may be effectively intersected by the DC magnetic field of the permanent magnet so as to minimize possible magnetic losses.

Figure 8:
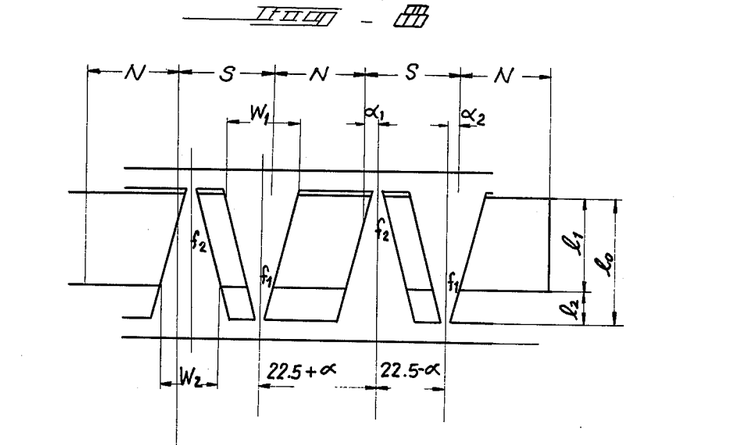
FIG. 8 is a fragmentary schematic illustration of another embodiment of the invention.
Figure 9:
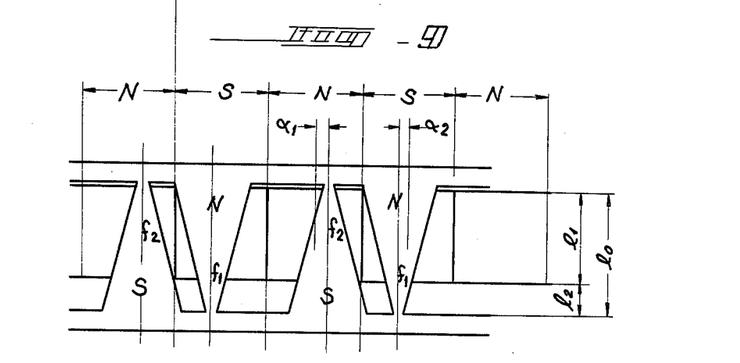
FIG. 9 is a schematic illustration of how the structure of FIG. 8 operates.

A second embodiment of the invention is illustrated in FIGS. 8–10. In this embodiment the tapered wall portions of the cylindrical wall means includes a first group $f1$ all of which are tapered in the same axial direction and a second group $f2$ which are tapered in an opposite axial direction, as is apparent from FIG. 8. The group $f1$ include eight tapered wall portions having their narrow ends directed downwardly, as viewed in FIG. 8, thhese narrow ends being uniformly distributed at equal intervals from one to the next circumferentially around the cylindrical wall means of the rotor corresponding to the cylindrical wall means 3 of FIGS. 1–3. The second group $f2$ also includes eight tapered wall portions having their oppositely directed narrow ends similarly distributed uniformly circumferentially around the rotor axis. In the embodiment of FIGS. 1–3, the several elongated apertures not only are of uniform circumferential width, but in addition all of these apertures have equal circumferential widths and the helical inclinations are equal although alternately in opposite directions, so that the angular distance from the axial center line of one tapered wall portion to the axial center line of the next tapered wall portion is uniformly 22.5° around the rotor axis. However, in the case of FIGS. 8–10, while the distance from the axial center line of one of the tapered wall portions $f1$ to the next tapered wall portion $f1$ is still 45°, as with FIGS. 1–3, in this embodiment the apertures which are inclined upwardly toward the right, as viewed in FIG. 8, have a circumferential uniform width greater than the circumferential uniform width of the apertures which are directed upwardly toward the left, as viewed in FIG. 8, so that the circumferential distance from the axial center line of a tapered wall portion $f1$ to the next oppositely tapered wall portion $f2$ is $22.5 + \alpha°$ while the next angular distance from the tapered wall portion $f2$ to the tapered wall portion $f1$ is $22.5 - \alpha°$, as illustrated in FIG. 8. Thus, the group of tapered wall portions $f2$ in the case of FIGS. 8–10 are not equidistantly spaced between the oppositely tapered group of wall portions $f1$ but instead are angularly offset to provide the relationship illustrated in FIG. 8. Nevertheless, in this embodiment also the total number of tapered wall portions is 16, equalling the number of poles of the permanent magnet means. The outer coil means of FIGS. 8–10 is identical with that of FIGS. 1–3 and the stationary permanent magnet means also is identical with the embodiment of FIGS. 1–3 having eight south poles which alternate with eight north poles as described above. However, the permanent magnet means of FIGS. 8–10, instead of being axially symmetrical with respect to the cylindrical wall means, has an effective axial length $l_1 = l_0 - l_2$, as indicated in FIGS. 8 and 9. The axial length $l_0$ represents the axial length of the permanent magnet means of FIGS. 1–3 while the axial length $l_2$ represents an axial void which is ineffective with respect to the tapered wall portions of the cylindrical wall means. Thus, with this embodiment the width W1 of the tapered wall portions $f1$ at the wide ends of the latter, opposed to the permanent magnet means, is greater than the width W2 of the oppositely tapered wall portions $f2$ which is axially aligned with the opposite end of the permanent magnet means, so that with this arrangement W1 is greater than W2. As a result, it is clear that the tapered wall portions $f1$ having the wider effective ends of the width W1 will be controlling or will in other words have the initiative with respect to the area over which the tapered wall portions are opposed to the permanent magnet means and with respect to the number of intersections of the magnetic flux, so that the direction of rotation will be controlled by the tapered wall portions $f1$.

FIG. 8 illustrates the static position which the motor takes in the non-excited state. In the case where both of the groups of tapered wall portions $f1$ $f2$ are uniformly arranged at equal angular intervals, as in the case of FIGS. 1–3, where $\alpha$ is equal to 0, then each tapered wall portion positively takes its position with its central axial line situated precisely in alignment with the boundary between a pair of successive poles of the permanent magnet means where the minimum magnetic resistance is encountered, as described above in connection with FIGS. 1–3. However, in the case of FIGS. 8–10, where one of the groups of tapered wall portions is angularly offset with respect to the other of the groups by the angle $\alpha$, as shown in FIGS. 8–10 and described above, so that $\alpha$ is not 0, then each tapered wall portion of the group $f1$ will be angularly displaced from the boundary line between a pair of successive poles of permanent magnet means by the angular distance $\alpha_2$ and similarly the oppositely tapered wall portions $f2$ will be angularly spaced from the boundary line between a pair of adjacent poles of the permanent magnet means by $\alpha_1$, wherein $\alpha_1 > \alpha_2$ because of the difference in the area over which the successive tapered wall portions of the two groups $f1$ and $f2$ are opposed to the permanent magnet means, or in other words because of the relationship according to which W1 > W2.

FIG. 9 indicates the dynamic position under excitation. This corresponds to the relative positions of the permanent magnet means and rotor at the instant when the group $f1$ has been magnetized so as to have north polarities and the group $f2$ has been magnetized so as to have south polarities simultaneously with the north polarities of the group $f1$. If all of the tapered wall portions were uniformly distributed at equal angular intervals, as with FIGS. 1-3, then each of the tapered wall portions $f1$ would be aligned with an associated south pole of the permanent magnet means. However, because of the angular offset provided with the embodiment of FIGS. 8-10, each tapered wall portions $f1$ is displaced from the center line of the associated south pole of the permanent magnet means by the permanent magnet means by the angle $\alpha_2$. The relationship $\alpha_1 > \alpha 2$ is established here also as a result of the difference in the area over which each tapered wall portion of the two groups is opposed to the permanent magnet means, or in other words due to the relationship W1 > W2.

FIG. 10 schematically illustrates the manner in which a torque in a particular direction is generated according to the invention. At the time point T0, the non-excited static state corresponding to FIG. 8 is provided. At the time point T1, there is a dynamic position during excitation, this position corresponding to that illustrated in FIG. 9. Each of the tapered wall portions of the groups $f1$ and $f2$ has turned, upon excitation, from its position at the time point T0 toward a polarity opposite to the polarity which previously was closest to the particular tapered wall portion. Thus, a magnetic balance is established in this dynamic position. In other words, at the time point T1 the tapered wall portions $f1$ had been excited so as to have north polarities while the tapered wall portions $f2$ have been excited so as to have south polarities, and therefore the rotor has turned toward the left, as viewed in FIG. 10, from the position at the time point T0 to the position indicated at the time point T1, as a result of the positions of the poles of the permanent magnet means as indicated at the upper part of FIG. 10.

At the time point T2, corresponding to a static position where the tapered wall portions $f1$ and $f2$ have moved as a result of deexcitation, the tapered wall portions again have a position corresponding to that of $T_0$ but with respect to the next following poles of the permanent magnet means, so that this position again is identical with that shown in FIG. 8 with each of the tapered wall portions f1 deviating from the center line of the associated south pole of the permanent magnet means by $\alpha_2$ at the time point T1 and now, upon deexcitation, positively moving toward the adjacent boundary line of the poles by $\alpha_2$. With respect to the factor such as W1, W2 and the area over which each tapered wall portion of the groups $f1$ and $f2$ are opesed to the permanent magnet means, the group $f1$ has the control or initiative. Thus, the static position is taken positively according to a torque and the direction determined by the groups $f1$. Each of the tapered wall portions of the groups $f1$ and $f2$ is balanced at its position and deviating from the associated cennter line of the poles of the permanent magnet means by $\alpha_1$ and $\alpha_2$, respectively.

At the time point T3, there is again a dynamic position to which the tapered wall portions $f1$ and $f2$ have moved as a result of a reverse 1-half cycle excitation at the time point T2. The groups $f1$ and $f2$ are now excited and move toward the adjacent poles of the permanent magnet means which are of opposite polarities, respectively. A balance is established at these new positions. This dynamic position is identical with the position show in FIG. 9 except that the polarities of the groups $f1$ and $f2$ have now been reversed. Then a series of operations as referred to above are repeated during each cycle from the time point T0, and in this way the rotation is continued.

A third embodiment of the invention is illustrated in FIGS. 11-16. According to this embodiment the rotor is identical with that illustrated in FIG. 2. Thus, the rotor has circumferentially distributed around its axis a first group $f1$ of eight tapered wall portions $3e$ with their narrow end regions directed downwardly, as viewed in FIGS. 14 and 15, while the second group $f2$ of eight tapered wall portions of $3e$ hve narrow end regions directed upwardly as viewed in FIGS. 14 and 15, and of course the tapered wall portions of this second group are arranged alternately with respect to and at uniform angular intervals with respect to the tapered wall portions of the first group. Also the number of tapered wall portions $3e$ corresponds to the number of poles of the permanent magnet means.

Figure 11:
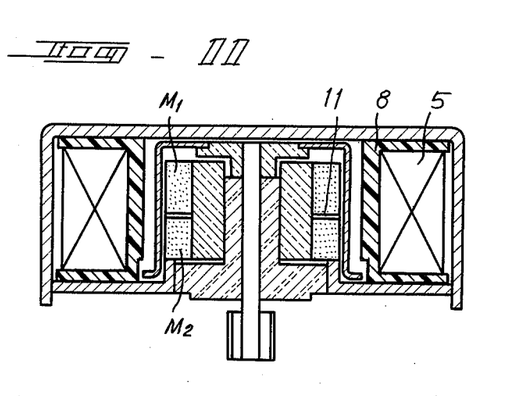
FIG. 11 is a sectional elevation of a further embodiment of the invention.
Figure 12:
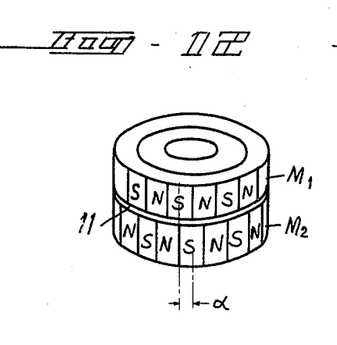
FIG. 12 is a schematic perspective view of the permanent magnet structure of the type shown in FIG. 11.
Figure 13:
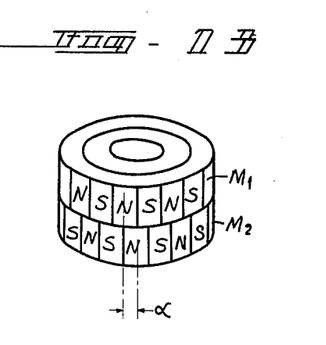
FIG. 13 is a perspective illustration of another embodiment of a permanent magnet structure.

In accordance with this particular embodiment of the invention, the stationary permanent magnet means has two series of alternating north and south poles as shown most clearly in FIGS. 12 and 13. Each series includes sixteen poles including eight north poles alternating with eight south poles. Thus, as indicated in FIGS. 11-13, the permanent magnet means includes one series M1 of alternating north and south poles and a second series M2 of alternating north and south poles. In the case of FIG. 12 there is situated between the two series M1 and M2 a plate 11 in the form of a circular disc of soft magnetic material serving to prevent a reaction on the rotor. In the case of FIG. 13, however, this plate 11 has been omitted and instead the two series of poles M1 and M2 are situated directly next to each other and integrally combined.

Figure 14:
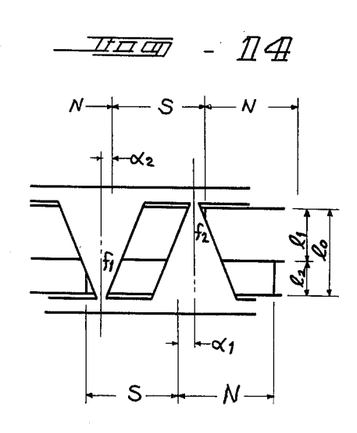
FIG. 14 is a schematic illustration of the behavior of the embodiment of FIG. 11 in the static or non-energized state.

However, in this embodiment the two series of poles M1 and M2 respectively have different axial lengths $l_1$ and $l_2$, as indicated in FIG. 14. Moreover, the poles of the series M2 are angularly offset with respect to the poles of the series M1 by the angle $\alpha$. Because of the different axial lengths $l_1$ and $l_2$, the series of poles M1 of the greater length will exert a greater magnetic force. The coil means 5, shown in FIG. 11, is identical with that of FIGS. 1 and 2.

Figure 15:
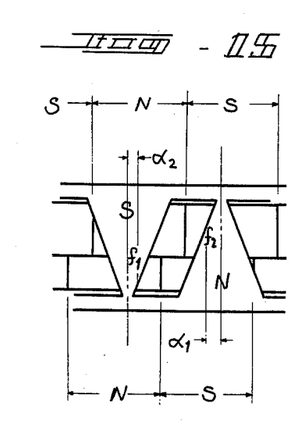
FIG. 15 illustrates schematically how the structure of FIG. 11 starts to operate.

FIG. 14 illustrates the position which the rotor takes in the non-excited or static position with respect to the stationary permanent magnet means. In the case where the magnet means includes only a single row of poles arranged at uniform angular intervals, the several tapered wall portions $f1$ and $f2$ positively move with their center lines angularly aligned with the boundary lines between the successive poles of the permanent magnet means, inasmuch as minimum magnet resistance is encountered in this position. With the embodiment of FIGS. 11-16, however, each of the tapered wall portions of the group $f1$ is balanced at a position angularly offset by the angular distance $\alpha_2$ from the associated boundary line between successive poles of the seriies M1, and each of the tapered wall portions of the second group f2 is balanced at an angular position offset by the angular distance $\alpha_1$ from the adjacent boundary line between successive poles of the second series M2. Thus, it will be seen that there has been established a magnetic relationship between the wide ends of the tapered wall portions of the first group f1 and the series M1, which has a priority or controlling effect with respect to the magnetic relationship, inasmuch as this latter relationship will be stronger than the relationship established between the wider ends of the oppositely tapered group f2 and the series M2. FIG. 15 illustrated the dynamic position upon excitation of the coil 5.

This latter position shown in FIG. 15 corresponds to the relative position of the permanent magnet means and the rotor at the moment when the first group of tapered wall portions f1 is magnetized so as to have a south polarity while the second group f2 is simultaneously magnetized with north polarity. In the case where the tapered wall portions are arranged at uniform angular intervals and the permanent magnet means includes a single row of poles, each tapered wall portion moves into exact alignment with the associated magnetic pole. With the embodiment of FIGS. 11–16, however, each tapered wall portion of the group f1 is balanced at a position $\alpha_2$ deviating from the center line of the associated pole of the series of poles M1 and each tapered wall portion of the second group f2 is balanced at a position $\alpha_1$ deviating from the center line of the associated pole of the second series of poles M2 of the permanent magnet means.

Figure 16:
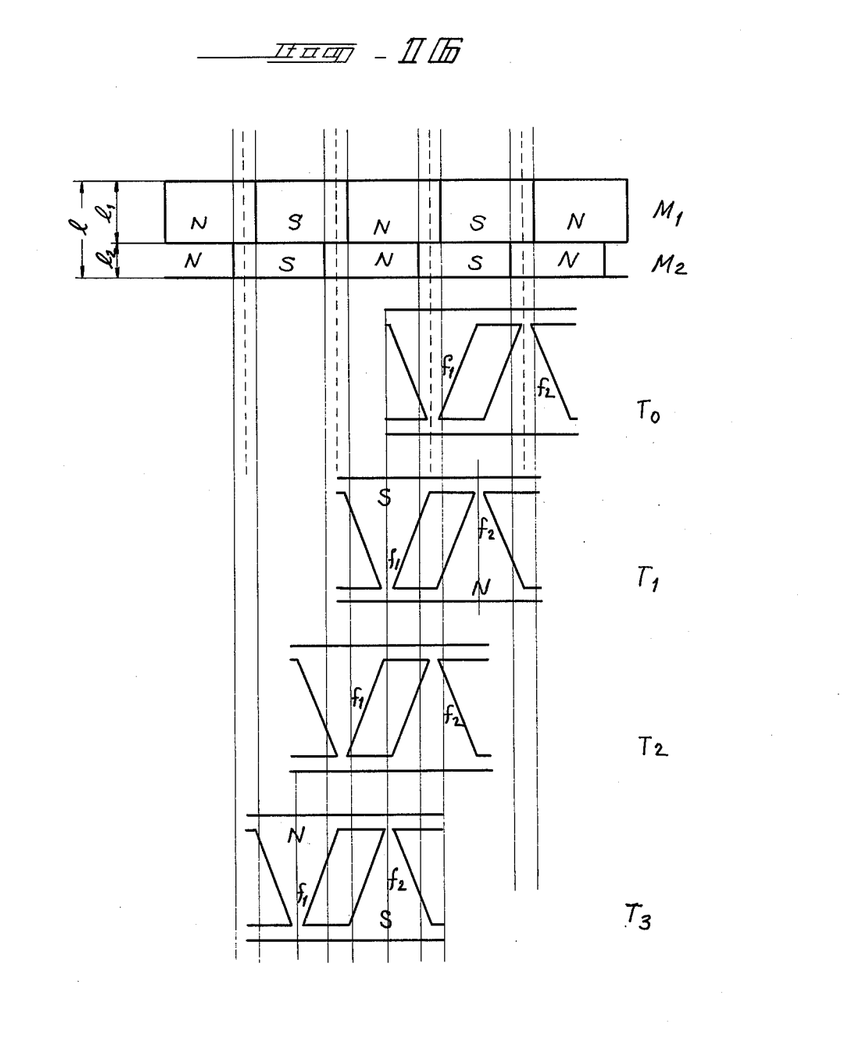
FIG. 16 is a diagrammatic representation of the manner in which the operation of the embodiment of FIG. 11 goes forward.

FIG. 16 illustrates the manner in which a directive torque is generated. Referring to FIG. 16, the time point T0 corresponds to the static non-excited state referred to above and illustrated in FIG. 14. At the time point T1, the dynamic position under excitation has been provided as illustrated in FIG. 15. Upon excitation from the position corresponding to the time point T0, the groups of tapered wall portions f1 and f2 move toward the respective most closely adjacent poles of opposite polarities and are magnetically balanced at their new positions according to this time point T1.

At the time point T2, there is again a position corresponding to the static position which is reached after deexcitation from the time point T1. Now each tapered wall portion f1 of the first group which was at the position $\alpha_2$ deviating from the associated pole positively moves toward the most adjacent boundary line of the poles by the angular distance $\alpha_2$. The first group f1 has the control or initiative with respect to factors such as the magnetic axial length and the are over which the tapered wall portions are opposed to the permanent magnet means. This sliding position at the time point T2 is assumed positively according to the torque at the direction of the first group f1. The respective boundary lines of the poles of the permanent magnet means and the tapered wall portions f1 and f2 are balanced, maintaining the respective deviations of $\alpha_2$ and $\alpha_1$.

At the time point T3, there is a dynamic position reached as a result of the reversed half-cycle excitation at the time point T2. The groups f1 and f2 are respectively balanced at their positions of opposite polarities which are most adjacent to their respective previous positions. This dynamic position is identical with that shown and described in connection with FIG. 15 except that the polarities of the tapered wall portions f1 and f2 are reversed. These operations are cyclically repeated from time point to the next so that a continuous rotation is achieved.

A fourth embodiment of the invention is illustrated in FIGS. 17–20. According to this embodiment the rotor is identical with the rotor 3 of FIGS. 1 and 2. Thus, the rotor has a first group of the elongated tapered wall portions f1 circumferentially distributed uniformly about its periphery, there being eight tapered wall portions 3e which form this first group f1 all of which are tapered in the same direction with their narrow ends directed downwardly, as is apparent from FIGS. 18 and 19. This first group alternates with the second group of tapering wall portions f2 which are identical with the first group except that they are axially tapered in the opposite direction, as described above in connection with FIG. 2. Thus, in the illustrated example eight tapered wall portions 3e of the second group f2 have their narrow ends directed upwardly, as viewed in FIGS. 18 and 19, and these wall portions respectively alternate with the wall portions f1. The total number of these oppositely tapered wall portions is equal to the number of poles of the permanent magnet means.

Figure 19:
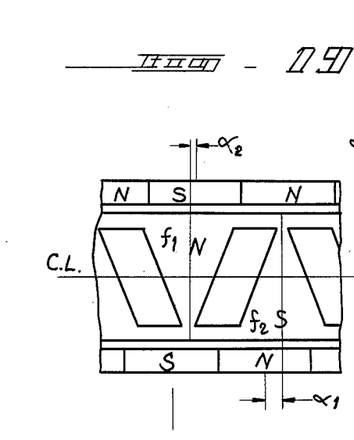
FIG. 19 illustrates schematically how the structure of FIG. 17 starts to operate.
Figure 20:
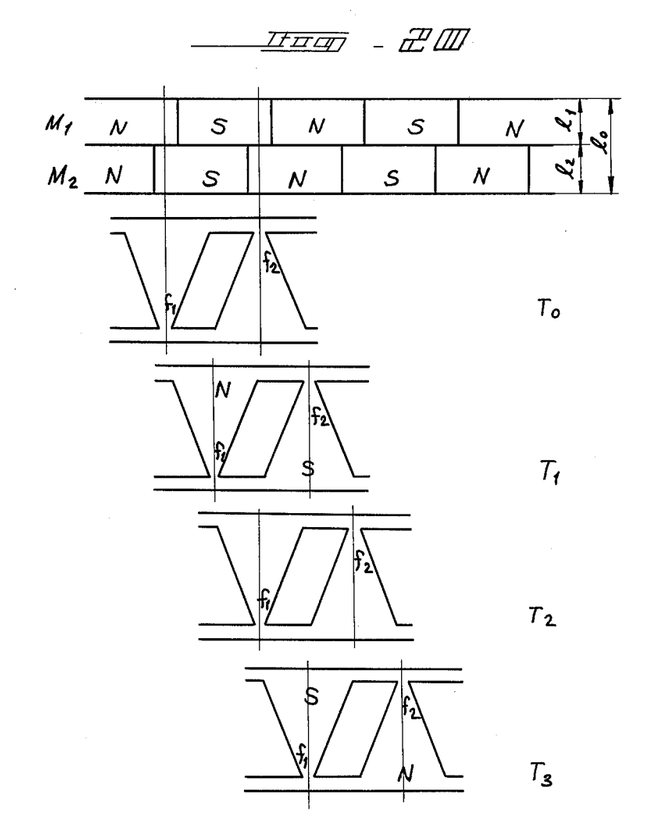
FIG. 20 is a schematic representation of the manner in which the embodiment of FIG. 17 goes forward during its operation.

In this embodiment of the invention the permanent magnet means is stationary and has the construction which is shown schematically at the upper part of FIG. 20 and in perspective in FIG. 12, this construction being similar to that of FIG. 11 except that the permanent magnets of the series M1 and M2 have the same axial length. Thus, the series M1 includes sixteen poles wherein eight north poles alternate respectively with eight south poles, and the same is true of the series of M2, with the poles of the latter being angularly displaced with respect to the poles of the former in the manner illustrated schematically in FIG. 20. It will be noted that the series of poles M1 and M2 are also schematically represented respectively at the upper and lower portions of FIGS. 18 and 19. Thus, the number of poles in each series corresponds to the total number of tapered wall portions 3e of the rotor. The equal axial heights $l_1$ and $l_2$ of the series M1 and M2 are indicated in FIG. 20 where the total height of both series is $l_0$. Thus, the dimensional and magnetic requirements are the same for both series M1 and M2. The corresponding poles of the same polarities are angularly offset with respect to each other by the angle $\alpha$, as shown most clearly in FIG. 18.

Figure 17:
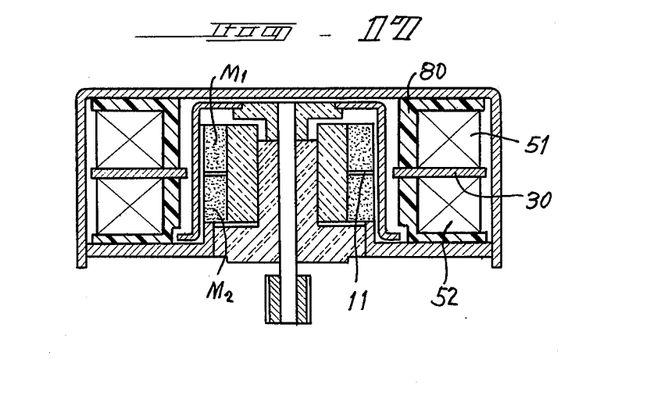
FIG. 17 is a sectional elevation of a still further embodiment of a motor according to the invention.

This particular embodiment of the invention, however, has a third magnetic pole 30 formed by a disc of soft magnetic material situated in the same plane as the disc 11 and separating the upper coil 51 of FIG. 17 from the lower coil 52. These coils together with the disc 30 are carried by the non-magnetic supporting structure 80 around which the coils are wound. Thus, these coils coaxially surround the magnetic rows of poles M1 and M2, so that there is between the permanent magnet means and the coils the axially extending cylindrical gap occupied by the cylindrical wall means which forms part of the rotor assembly. This gap is defined between the inner surface of the coil supporting structure 80 and the outer surface of the permanent magnet means, with the disc 30 of soft magnetic material serving as the third magnetic pole. It will be seen that the inner peripheral edge of the disc 30 is situated closer to the cylindrical wall means of the rotor than the inner surface of the coil supporting structure 80. In this way a highly desirable magnetic field is established, as will be apparent from the description below.

With this embodiment it is possible by connecting the coils 51 and 52 to suitable AC source to achieve different excitations for the upper and lower coils separated by the third magnetic pole. In other words the alternating current of these coils will have a predetermined outer phase relationship with respect to each other. The excitation circuit may be a single circuit or a double circuit and may be either a series circuit or a parallel circuit. In other words the coils can be connected either in series of in parallel. Thus, with this embodiment it is possible to have a circuit which will provide an excitation having a phase difference at the coils 51 and 52 corresponding to the angle α by which the rows of poles M1 and M2 are out of phase with each other.

Figure 18:
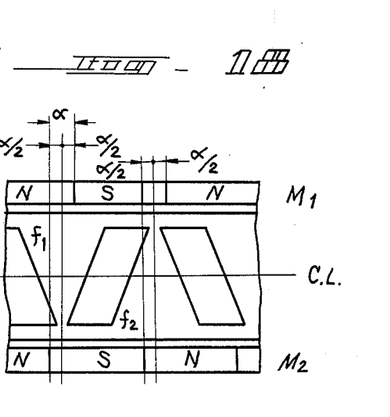
FIG. 18 schematically represents the structure of FIG. 17 in the static or non-energized state.

FIG. 18 illustrates the position which the motor takes in the non-excited state. Thus, in this case there the groups $f1$ and $f2$ of tapered wall portions of the rotor are arranged at uniform angular intervals each tapered wall portion will positively move to a position angularly aligned with a boundary line of an associated adjacent pair of poles where the minimum magnetic resistance is encountered. As a result of the angular out-of-phase relationship between the rows of poles M1 and M2, equal to the angle α, each tapered wall portion will be situated in the manner illustrated in FIG. 18 at an angle $\alpha/2$ from the boundary line between a pair of adjoining poles of the upper and lower series M1 and M2, in the manner indicated in FIG. 18.

FIG. 19 illustrates the operation upon excitation. The position of the third magnetic pole 30 is indicated by the line CL extending horizontally in FIGS. 18 and 19. Upon excitation, the initiative or control is provided at the structure situated over the plane CL in FIGS. 18 and 19 while a relatively feeble excitation is provided below this plane. Upon excitation, an intense north pole is generated at the base or wider regions of the group of tapered wall portions $f1$ while a feeble south pole is generated at the base or wider regions of the oppositely tapered group of wall portions $f2$. With respect to the relationship between the north poles generated at the group $f1$ and the south poles of the series M1 of the permanent magnet means, the group $f1$ should become precisely angularly aligned with the south poles of the series M1. However, due to the action between the south poles induced simultaneously in the group of oppositely tapered wall portions $f2$ and the north poles of lower series M2 of the permanent magnet means as well as the angle α, the group $f1$ is balanced with the respective south poles of the series M1 according to an angular deviation angle of $\alpha_2$, as indicated at the upper portion of FIG. 19, and accordingly the group $f2$ are situated with their south poles having respect to the north poles the lower series M2 of the permanent magnet means the angular deviation angle $\alpha_1$, shown at the lower part of FIG. 19. The latter angle will increase in proportion to the degree of excitation of the row of poles M1 and the tapered wall portion $f1$. The deviation or offset angles $\alpha_1$ and $\alpha_2$ will be equal when the oppositely tapered groups of wall portions $f1$ and $f2$ are equally excited.

FIG. 20 illustrates the manner in which a directive torque is generated with this embodiment. At the time point T0, the static position prevails as described above in connecton with FIG. 18. At the time point T1, correspondng to the dynamic position under excitation, the conditions are provided as described above in connection with FIG. 19. Thus upon excitation the tapered wall portions of the groups $f1$ and $f2$ turn toward the respective most adjacent poles of opposite polarities and a magnetic equilibrium or balance is provided at this position corresponding to the time point T1. At the next time point T2 there is again a static position resulting from the deexcitation which takes place subsequent to the time point T1. The series of poles M1 and M2 of the permanent magnet means are equal to each other in magnetic force. However they deviate from each other by the angle α. At the time point T1, the wider ends of the group $f2$ already were associated with the positions $\alpha/2$ deviated from the associated pole boundary lines of the row of poles M2, and, therefore, each of the tapered wall portions of the group $f2$ smoothly turns into central alignment with the angle $\pm \alpha/2$. Similarly, each of the tapered wall portions of the group $f1$ is stabilized at the position $\pm\alpha/2$ deviating from the associated pole boundary lines of the other series M1.

At the time point T3, there is again a dynamic position which is reached as a result of the subsequent reversed half-cycle excitation. The tapered wall portions of the groups $f1$ and $f2$ now turn, upon excitation from the state at the time point T2, toward the respective most adjacent poles of opposite polarities. This dynamic position is identical with that illustrated in FIG. 19 and the control for the direction of rotation is provided as a result of the initiative given to the group of tapered wall portions $f1$ of which the wider ends are excited more intensely than the corresponding portions of the oppositely tapered group of wall portions $f2$.

As is apparent from the above description, one of the important features of the present invention resides in the use of a bipolar rotor which is capable of greatly improving the self-starting characteristics and increasing the torque in a manner far beyond what has heretofore been possible. The association of a simple solenoid with the narrow end regions of the tapered wall portions of the cylindrical rotor enables both north and south poles to be simultaneously generated on the same rotor. The distribution of the magnetic flux takes place over the peripheral surface of the rotor with this distribution having a variation and an important effect in cooperation with the electrical flowing through the coil means so as to provide a high torque at the cylindrical rotor. The north and south polarities are generated at the regions of the rotor which are situated distant from the narrow end regions of the tapered wall portions.

Figure 21:
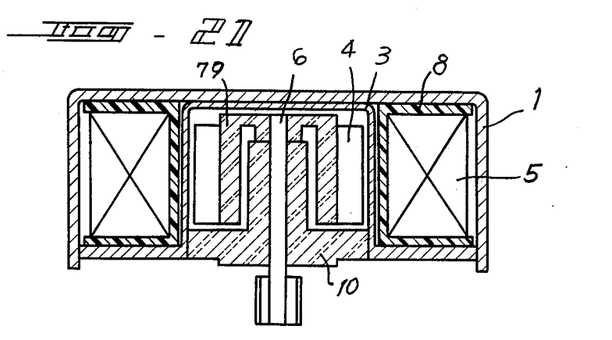
FIG. 21 is a sectional elevation of a still further embodiment of the invention.
Figure 22:
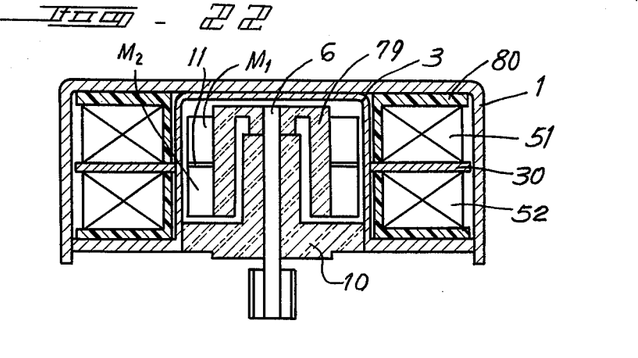
FIG. 22 is a sectional elevation of a further variation of the structure of the invention illustrating yet another embodimemt.
Figure 23:
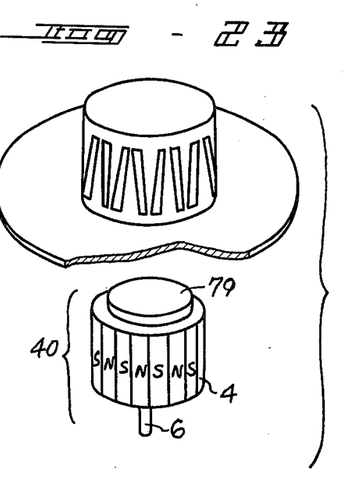
FIG. 23 is a fragmentary partly sectional exploded view of the embodiment of FIG. 21.
Figure 24:
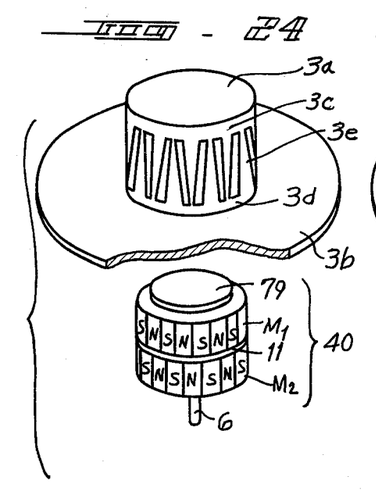
FIG. 24 is a partly sectional fragmentary exploded perspective illustration of the embodiment of FIG. 22.

Two additional embodiments of the invention are illustrated in FIGS. 21 and 22 while FIGS. 23 and 24 illustrate further details of the embodiments of FIGS. 21 and 22, respectively. As has already been pointed out above, the present invention is based on the concept that rotation in a self-starting manner is generated by way of the interaction between the tapered wall portions of the rotor which are formed of a soft magnetic material and which are adapted to be AC excited and the permanent magnet means, and this concept is common to all of the above embodiments. However, the arrangement according to which the cylindrical wall means with its tapered wall portions forms the rotor while the permanent magnet means remains stationary is clearly reversible in the sense that it is also possible to provide an arrangement where the cylindrical wall means is stationary and forms part of the stator assembly while the permanent magnet means forms part of the rotor assembly. Such a variation of course will not conflict with the basic concept on which all of the above-described embodiments are based. Such a reversal in the stator and rotor components is illustrated in the embodiments of FIGS. 21 and 22.

Thus, referring to FIG. 21, this embodiment includes a casing 1 having in its interior a coil means 5 wound around the supporting structure 8 with this embodiment also having a rotor shaft 6 supported by a bearing 10 and surrounded by a permanent magnet means 4, all of these features being identical with the embodiment of FIGS. 1 and 2 except that in FIG. 21 the permanent magnet means is connected to the shaft 6 so as to be rotatable therewith.

In FIG. 22, there is also the casing 1, but in this case the coil means takes the form of a pair of coils 51 and 52 while the permanent magnet means includes the series M1 and M2, the latter series being separated by the soft magnetic disc 11 situated in the same plane as the soft magnetic disc 30, while in this case also there is a rotor shaft 6, so that the embodiment of FIG. 22 is identical with that of FIG. 17 except that in FIG. 22 the permanent magnet means is connected to the rotor shaft for rotation therewith. Thus, FIGS. 23 and 24 illustrate the rotors 40 of FIGS. 21 and 22, respectively, and it is apparent that in each case the shaft 6 is fixed by way of a non-magnetic body 79 to the permanent magnet means. Of course the bearing 10 is also made of a non-magnetic material and is fixed in the central aperture of the base plate 3b of the stator assembly.

The cylindricall wall means of this embodiment is stationary and forms part of the stator assembly, the cylindrical portion which projects from the inner periphery of the base 3b having the oppositely inclined helical apertures as described above extending between the annular yoke portions 3c and 3d thus defining between themselves the tapered wall portions 3e which are oppositely tapered one with respect to the next in the manner shown in FIGS. 23 and 24 and described above. The base plate 3b forms a yoke together with the casing, and in this embodiment the opposed end 3a of the cylindrical wall means directly engages over its entire area the transverse wall of the casing 1 while the periphery of the base plate 3b is fixed directly to the inner surface of the casing 1, so that the parallel wall portions 3a and 3b of the cylindrical wall means form part of the stator and are parallel to each other as well as to the transverse wall of the casing 1 to provide a closed AC magnetic circuit which has no gap.

In the embodiment of FIG. 22, the interposition of the soft magnetic disc 30 between the coils 51 and 52 serves to provide a third magnetic circuit with this disc 30 being identical with the disc 30 of FIG. 17 both in its arrangement and its function. Thus, the soft magnetic disc 30 is arranged in such a way that its outer periphery is in contact with the inner surface of the casing 1 while the inner periphery of the soft magnetic disc 30 contacts the cylindrical stator midway between the opposed parallel flat wall portions 3a and 3b thereof, in the manner indicated in FIG. 22. Of course in this embodiment since the cylindrical wall means 3 is stationary it is possible to provide direct contact between the disc 30 and the cylindrical wall means 3, whereas a slight spacing is required in FIG. 17 because the cylindrical wall means of the latter embodiment forms part of the rotor and turns with respect to the disc 30.

The cylindrical portion of the wall means 3 which is formed with the helically extending apertures which define between themselves the oppositely tapered wall portions 3e coaxially surrounds the shaft 6 and is of a circular cross-sectional configuration. A narrow axially extending annular gap of uniform radial thickness is defined between this cylindrical wall portion of the stator and the outwardly directed surface of the rotor 40 where the permanent magnet means is situated. Except for the rotor 40 all of the parts are stationary and form part of the stator assembly. Thus, it will be seen that except for the fact that the cylindrical wall means is stationary it has a construction substantially identical with the cylindrical wall means 3 of FIG. 2. The primary difference is that in FIGS. 21-24 the base 3b instead of taking the form of a relatively narrow flange, as shown in FIG. 2, extends all the way to the inner surface of the casing 1.

A torque is generated with the embodiments of FIGS. 21 and 22 in precisely the same way as described above in connection with FIGS. 1 and 17, insasmuch as the fact that the permanent magnet means is rotatable while the cylindrical wall means is stationary does not influence the principle of operation. Thus a rotation of self-starting type is achieved by way of the interaction of the tapered wall portions 3e and the permanent magnet means with the torque being reliably generated irrespective of whether the magnet means serves as the rotor or the cylindrical wall means 3 serves as the rotor, inasmuch as these components are reversible with respect to their stationary and rotary mountings, as is apparent from the above description.

Of course, when the permanent magnet means serves as the rotor, as shown in FIGS. 21-24, the direction of rotation is reversed as compared with the other embodiments.

What is claimed is:

1. In a synchronous micromotor, outer coil means circumferentially surrounding a predetermined axis, a rotary rotor shaft extending along said axis and surrounded by said outer coil means, annular permanent magnet means surrounding said rotor shaft and situated coaxially between the latter and said coil means, said annular permanent magnet means having a series of north and south poles circumferentially distributed therealong with said north poles alternating with said south poles and all of said poles being directed outwardly toward said coil means, cylindrical wall means made of a soft magnetic material and circumferentially surrounding said annular permanent magnet means while being situated between the latter and said coil means, said cylindrical wall means having a pair of annular yoke portions spaced from each other along said axis and surrounding said axis, and said cylindrical wall means being formed between said yoke portions with a series of elongated separate apertures circumferentially spaced from each other and each extending from one to the other of said yoke portions up to but not beyond said yoke portions and said series of apertures being made up of two groups of apertures one of which is inclined helically in one direction with respect to said axis and the other of which is inclined helically in an opposite direction with respect to said axis and the apertures of said one group alternating with the apertures of said other group so that said annular yoke portions are bridged by and integral with a series of elongated tapered wall portions of said cylindrical wall means with said tapered wall portions alternately tapering in opposed axial directions, said cylindrical wall means and said annular permanent magnet means forming a pair of means one of which is connected with said rotor shaft for rotary movement therewith, to form a rotor assembly with said shaft, while the other of said pair of means and said coil means form part of a stator assembly.

2. The combination of claim 1 and wherein each of said apertures has opposed ends situated at equal circumferential distances from adjoining ends of the immediately preceding and immediately following apertures so that said tapering wall portions all have narrow ends of equal circumferential width and wide ends of equal circumferential width.

3. The combination of claim 2 and wherein all of said apertures are of a uniform circumferential width along their entire length.

4. The combination of claim 3 and wherein the uniform circumferential width of said one group of apertures is equal to the uniform circumferential width of the other group of apertures.

5. The combination of claim 3 and wherein the uniform circumferential width of said one group of apertures is greater than the uniform circumferential width of the other group of apertures.

6. The combination of claim 5 and wherein said annular permanent magnet means is axially offset with respect to said cylindrical wall means for providing a void of predetermined axial size between said annular permanent magnet means and one of said yoke portions while said annular permanent magnet means is situated axially closer to the other of said yoke portions.

7. The combination of claim 3 and wherein said annular permanent magnet means is axially situated symmetrically with respect to said yoke portions of said cylindrical wall means.

8. The combination of claim 3 and wherein said annular permanent magnet means includes a single series of north and south poles circumferentially alternating with each other.

9. The combination of claim 3 and wherein said annular permanent magnet means includes a pair of circumferential series of north and south poles situated axially adjacent each other with the north and south poles of each series alternating circumferentially with respect to each other.

10. The combination of claim 9 and wherein the poles of both series have equal axial lengths.

11. The combination of claim 9 and wherein the poles of one of said series have an axial length greater than the poles of the other of said series.

12. The combination of claim 9 and wherein said permanent magnet means includes a plate of soft magnetic material situated in a plane normal to said axis between the two series of poles 13. The combination of claim 3 and wherein said outer coil means includes a single coil.

14. The combination of claim 3 and wherein said outer coil means includes a pair of coils situated axially adjacent each other.

15. The combination of claim 14 and wherein a plate of soft magnetic material is situated between said pair of coils in a plane normal to said axis.

16. The combination of claim 15 and wherein said annular permanent magnet means includes a pair of series of circumferentially arranged alternating north and south poles situated axially adjacent each other and a plate of soft magnetic material situated between the two series of poles in the same plane as said plate of soft magnetic material situated between said pair of coils.

17. The combination of claim 3 and wherein said annular permanet magnet includes a pair of series of alternating north and south poles each circumferentially distributed about said axis with one of said series situated axially adjacent the other of said series but having its poles circumferentially offset with respect to the poles of the other series.

18. The combination of claim 1 and wherein said cylindrical wall means forms said one of said pair of means which is connected with said shaft to form said rotor assembly therewith, said annular permanent magnet means remaining stationary with respect to said shaft and cylindrical wall means.

19. The combination of claim 1 and wherein said annular permanent magnet means forms said one of said pair of means which is connected with said shaft for rotation therewith to form part of said rotor assembly, said circumferential wall means remaining stationary with respect to said permanent magnet means.

* * * * *